(12) United States Patent
Pelecanos et al.

(10) Patent No.: US 7,647,827 B2
(45) Date of Patent: Jan. 19, 2010

(54) MACHINE AND OPERATING ENVIRONMENT DIAGNOSTICS, DETECTION AND PROFILING USING SOUND

(75) Inventors: Jason William Pelecanos, Ossining, NY (US); Douglas George Heintzman, Pleasantville, NY (US); Jiri Navratil, White Plains, NY (US); Ganesh N. Ramaswamy, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/128,321

(22) Filed: May 28, 2008

(65) Prior Publication Data

US 2008/0257047 A1 Oct. 23, 2008

Related U.S. Application Data

(63) Continuation of application No. 11/408,770, filed on Apr. 21, 2006.

(51) Int. Cl.
- *G01H 13/00* (2006.01)
- *G01H 17/00* (2006.01)
- *B60C 23/00* (2006.01)

(52) U.S. Cl. .......................... 73/579; 73/593; 340/442; 340/446

(58) Field of Classification Search .................. 73/579, 73/593; 340/442, 446
See application file for complete search history.

(56) References Cited

U.S. PATENT DOCUMENTS

| | | | |
|---|---|---|---|
| 2,735,292 A | 2/1956 | Apps | |
| 2,820,361 A | 1/1958 | Apps | |
| 4,129,276 A | 12/1978 | Svet | |
| 4,257,273 A * | 3/1981 | Knowd | 73/647 |
| 4,432,096 A * | 2/1984 | Bunge | 704/206 |
| 4,790,190 A | 12/1988 | Bambara et al. | |
| 4,843,885 A | 7/1989 | Bambara | |
| 5,150,618 A | 9/1992 | Bambara | |
| 5,619,616 A * | 4/1997 | Brady et al. | 706/20 |
| 5,761,383 A | 6/1998 | Engel et al. | |
| 5,798,983 A | 8/1998 | Kuhn et al. | |
| 6,204,778 B1 | 3/2001 | Bergan et al. | |
| 6,281,787 B1 * | 8/2001 | Lerg et al. | 340/442 |
| 6,370,957 B1 | 4/2002 | Filippenko et al. | |
| 6,504,490 B2 | 1/2003 | Mizushima | |
| 6,739,195 B2 * | 5/2004 | Evans et al. | 73/598 |
| 7,071,841 B2 | 7/2006 | Haynes et al. | |
| 2005/0041529 A1 * | 2/2005 | Schliep et al. | 367/99 |
| 2005/0066730 A1 | 3/2005 | Raichle | |
| 2005/0100172 A1 | 5/2005 | Schliep et al. | |
| 2007/0027607 A1 * | 2/2007 | Norris et al. | 701/100 |

* cited by examiner

*Primary Examiner*—Hezron Williams
*Assistant Examiner*—Rose M Miller
(74) *Attorney, Agent, or Firm*—F. Chau & Associates, LLC

(57) ABSTRACT

A method, system and program storage device are provided for machine diagnostics, detection and profiling using pressure waves, the method including profiling known sources, acquiring pressure wave data, analyzing the acquired pressure wave data, and detecting if the analyzed pressure wave data matches a profiled known source; the system including a processor, a pressure wave transducer in signal communication with the processor, a pressure wave analysis unit in signal communication with the processor, and a source or threat detection unit in signal communication with the processor; and the program storage device including program steps for profiling known sources, acquiring pressure wave data, analyzing the acquired pressure wave data, and detecting if the analyzed pressure wave data matches a profiled known source.

20 Claims, 4 Drawing Sheets

MACHINE AND OPERATING ENVIRONMENT DIAGNOSTICS, DETECTION AND PROFILING USING SOUND

CROSS-REFERENCE TO RELATED APPLICATION

This is a continuation application of co-pending U.S. application Ser. No. 11/408,770, filed on Apr. 21, 2006, and entitled "MACHINE AND OPERATING ENVIRONMENT DIAGNOSTICS, DETECTION AND PROFILING USING SOUND", which is incorporated by reference herein in its entirety.

BACKGROUND

The present disclosure generally relates to pressure wave detection, and more particularly relates to profiling or diagnosis of machines or their environments using pressure waves. Pressure waves are transmitted through air, and include sound waves in the audible frequency range, as well as infrasound and ultrasound waves.

The safety of people and transportation systems is of paramount importance. Many people rely on automobile transportation as a primary means of transport. The New York State Department of Motor Vehicles reported, in statewide statistics for the calendar year 2003, that vehicle defects contributed to at least 5% of all automobile accidents. In addition, there were approximately 600 accidents reported as being attributed to tire failure and 1200 related to brake failure. Operator error and environmental conditions also affect the safety of travel. Consequently, there is a need to improve the safety of vehicles traveling on public roadways.

Safety imperatives are not confined to road based transportation. For example, infrasound data might be used to warn airplane pilots of currently undetectable and dangerous clear-air turbulence. Such technology may be useful for transportation via automobile, airplane, train and subway, where operator error, mechanical defects and/or environmental factors, if undetected, may contribute to hazardous conditions.

Safety initiatives introduced by vehicle manufacturers, public safety agencies and insurance companies generally rely on a multi-pronged approach. From a manufacturer's perspective, safety is addressed through crash avoidance mechanisms and damage mitigation. From the public safety viewpoint, controls are introduced through education campaigns, traffic monitoring and enforcement. That is, traffic authorities have mechanisms to statistically address road safety through educating and fining drivers perceived to be careless, and performing vehicle inspections or roadworthiness tests to exclude relatively dangerous equipment. Through increased insurance rates, insurance companies have another way to penalize the vehicle operators and/or owners in the years subsequent to a public safety violation. A remaining challenge is to provide effective technologies to support increased travel safety in a more direct, proactive and timely manner.

The various needs of vehicle manufacturers, owners, operators, passengers and pedestrians, as well as those of the traffic regulatory authorities, may be addressed by providing early vehicular hazard detection technologies and environmental hazard detection systems. In a typical case, an operator would not be aware of an impending vehicle failure or environmental hazard until it occurred. Through early detection, many of these impending equipment failures and/or environmental hazards may be detected, and the proximate hazardous situations may be averted.

There are a number of discrete accident prevention technologies that focus on safety from different viewpoints. Such examples of in-vehicle accident prevention technologies include automatic braking systems, networked engine diagnostics, all-wheel-drive, stability controls, tire pressure monitoring systems, and tailgating prevention mechanisms. In addition to safety, these and other technologies may have application to the maintenance, diagnosis and optimal performance of machines and their environments. These technologies may significantly boost the safety margins of under-maintained vehicles and/or relatively unskilled operators closer to the levels of well-maintained vehicles and/or highly skilled operators.

Unfortunately, each of these technologies is separate and distinct. In addition, each is burdened with its own associated additive costs and drawbacks. There are also technologies that can alert the user to impending risks by selectively playing amplified audio events according to their importance or location. Thus, it is desirable to address safety, maintenance, diagnosis and/or performance optimization of machines and their environments. What is needed is an improved method for detecting a broader range of disparate safety threats, at least some of which were heretofore difficult or impossible for even skilled operators to sense or recognize.

SUMMARY

These and other drawbacks and disadvantages of the prior art are addressed by a system and method for machine and operating environment diagnostics, detection and profiling using sound.

An exemplary method is provided for machine diagnostics, detection and profiling using pressure waves. The exemplary method includes profiling known sources, acquiring pressure wave data, analyzing the acquired pressure wave data, and detecting if the analyzed pressure wave data matches a profiled known source.

An exemplary system is provided for machine diagnostics, detection and profiling using pressure waves. The exemplary system includes a processor, a pressure wave transducer in signal communication with the processor, a pressure wave analysis unit in signal communication with the processor, and a threat detection unit in signal communication with the processor.

An exemplary program storage device is provided for machine diagnostics, detection and profiling using pressure waves. The exemplary program storage device includes program steps for profiling known sources, acquiring pressure wave data, analyzing the acquired pressure wave data, and detecting if the analyzed pressure wave data matches a profiled known source.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches machine diagnostics, detection and profiling using sound in accordance with the following exemplary figures, in which.

DETAILED DESCRIPTION OF PREFERRED EMBODIMENTS

Figure 1:
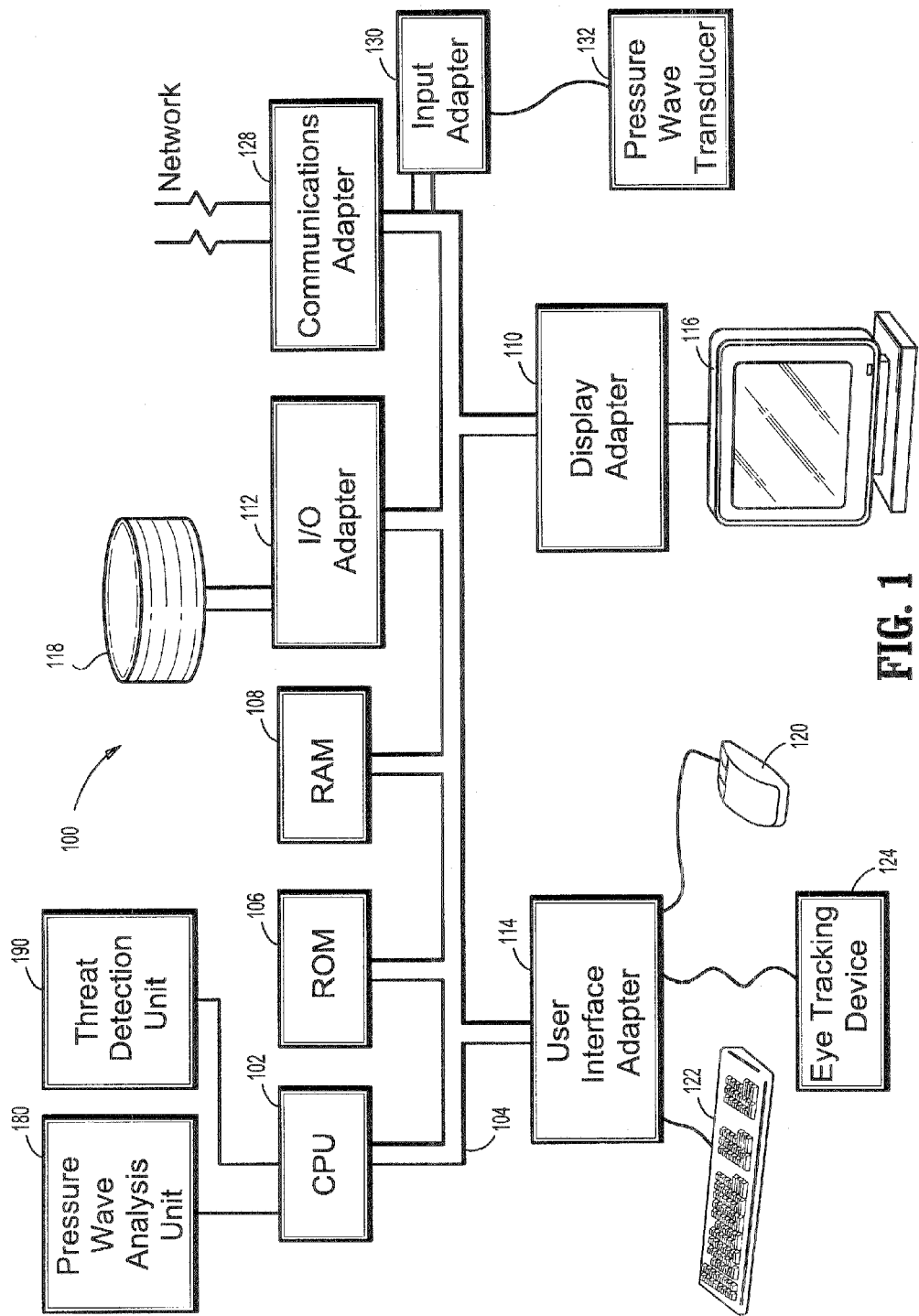
FIG. 1 shows a schematic diagram of a system for machine diagnostics, detection and profiling using sound in accordance with an illustrative embodiment of the present disclosure.

Pressure wave or sound technology can be used to address existing shortcomings of road and vehicle safety, and can provide safety mechanisms unlike any other current technology. This technology can be used to diagnose technical problems with the vehicle or machine, identify hazardous conditions, monitor road quality or regulate the roadworthiness of vehicles either locally on the machine itself, or remotely from a distant location. Unfortunately, there are few known devices that detect the hazards of the environment that the vehicle may be operating in for the purpose of alerting the driver. Pressure wave or sound technology has an essential role that can address this void.

Exemplary embodiments of the present disclosure utilize sound waves generated by the vehicle or machine, the environment, or the interaction between the two, to profile, detect or diagnose vehicular and/or environmental hazards or characteristics. In one embodiment, driver and passenger safety is improved by automatically detecting, via sound waves, mechanical or other defects while the vehicle or machine is in operation.

Conventional solutions rely on a human operator to determine a problem with the vehicle or machine, typically using the human senses. In many circumstances, the human operator would not be aware that there is a defect until a catastrophic failure occurs. In addition, safety officials can use such a device to detect unsafe machines from a distance and have the problem repaired or enable the machine owner to be informed. An automatic solution that may be activated onboard the machine itself or remotely to detect sound events is a highly desired solution. This solution will likely reduce machine repair costs because of early detection, and ultimately increase human safety.

An exemplary method uses microphones and corresponding signal processing techniques to immediately identify sounds of interest while the machine is operation. These sounds of interest may be noises attributed to a car traveling along the highway with a flat pneumatic tire, or a tire with a bulge or cut in it. The method can be applied to any machine while in normal operation. The sensors can be onboard the machine for the purpose of in-car diagnostics, for example, or operated a distance from the sound source as in typical police radar and safety enforcement scenarios. The technology enables automobiles, as well as other types of vehicles and crafts, to automatically determine failures that would not be readily detectable otherwise using direct measurement. The system can be easily tailored to provide an early warning to hazardous events in an on-device manner, or in hostile and otherwise inaccessible environments through remote sound detection, diagnostics and profiling.

An exemplary device is capable of detecting numerous types of hazardous conditions and other profile information. These conditions are detected and profiled by analyzing the sound waves that may be attributed to the hazardous situation.

The device operates as follows; (i) an audio or infra/ultra sonic microphone measures the airwaves or mechanical vibrations (a sound dish or microphone array also achieves this purpose), (ii) the signal is amplified, (iii) pertinent features are extracted and (iv) the signal is classified or profiled.

The sound based device can be operated in four distinct configurations. The first mode is when the system attempts to detect problems with (or determine audio profile statistics for) the machine that is in operation through a sound based analysis (using audio, infra- and/or ultrasound wave information). The second configuration is to detect problems with (or determine audio profile information for) the environment in which the system is running. For each of these configurations, the sound sensing system may be operated locally on the machine (or in the particular environment) or remotely from a distance to the noise source of interest.

As shown in FIG. 1, a system for machine diagnostics, detection and profiling using sound, according to an illustrative embodiment of the present disclosure, is indicated generally by the reference numeral 100. The system 100 includes at least one processor or central processing unit (CPU) 102 in signal communication with a system bus 104. A read only memory (ROM) 106, a random access memory (RAM) 108, a display adapter 110, an I/O adapter 112, a user interface adapter 114 and a communications adapter 128 are also in signal communication with the system bus 104. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114.

A pressure wave transducer or microphone 132 is in signal communication with an input adapter 130, which, in turn, is in signal communication with the system bus 104 and the CPU 102. A pressure wave analysis unit 180 and a pressure wave source detection, audio profiler, or safety threat detection unit 190 are also included in the system 100 and in signal communication with the CPU 102 and the system bus 104. While the pressure wave analysis unit 180 and the threat detection unit 190 are illustrated as coupled to at least one processor or CPU 102, these components are preferably embodied in computer program code stored in at least one of the memories 106, 108 and 118, wherein the computer program code is executed by the CPU 102.

Figure 2:
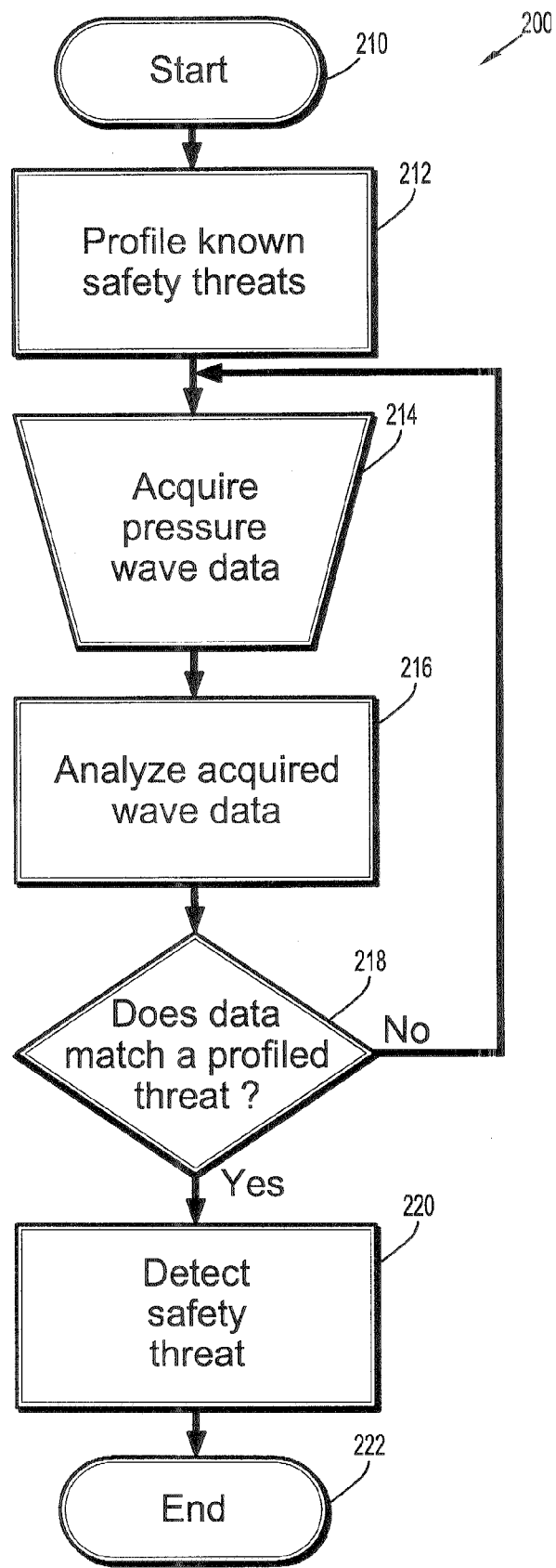
FIG. 2 shows a flow diagram of a method for machine diagnostics, detection and profiling using sound in accordance with an illustrative embodiment of the present disclosure.

Turning to FIG. 2, a method for machine diagnostics, detection and profiling using sound is indicated generally by the reference numeral 200. The method 200 includes a start block 210, which passes control to a function block 212. The function block 212 profiles known types of sources and/or safety threats, and passes control to an input block 214. The input block 214, in turn, receives pressure wave data, such as from a microphone, and passes control to a function block 216.

The function block 216 analyzes the acquired wave data, such as by performing a fast-Fourier transform analysis, an autocorrelation analysis, a periodogram analysis, or by using various feature extraction and pattern classification techniques. The function block 216 may perform profile analysis for matching as well as estimation of machine operating parameters, such as estimating the RPM of an engine, for example. The function block 216 passes control to a decision block 218. The decision block 218, in turn, determines whether the analyzed wave data matches the profiles for any known sources and/or safety threats, and if so, passes control to a function block 220 to detect the source or safety threat.

The function block 220 may pass control to an end block 222. If no source or safety threat matches are found, the decision block 218 passes control back to the input block 214.

Figure 3:
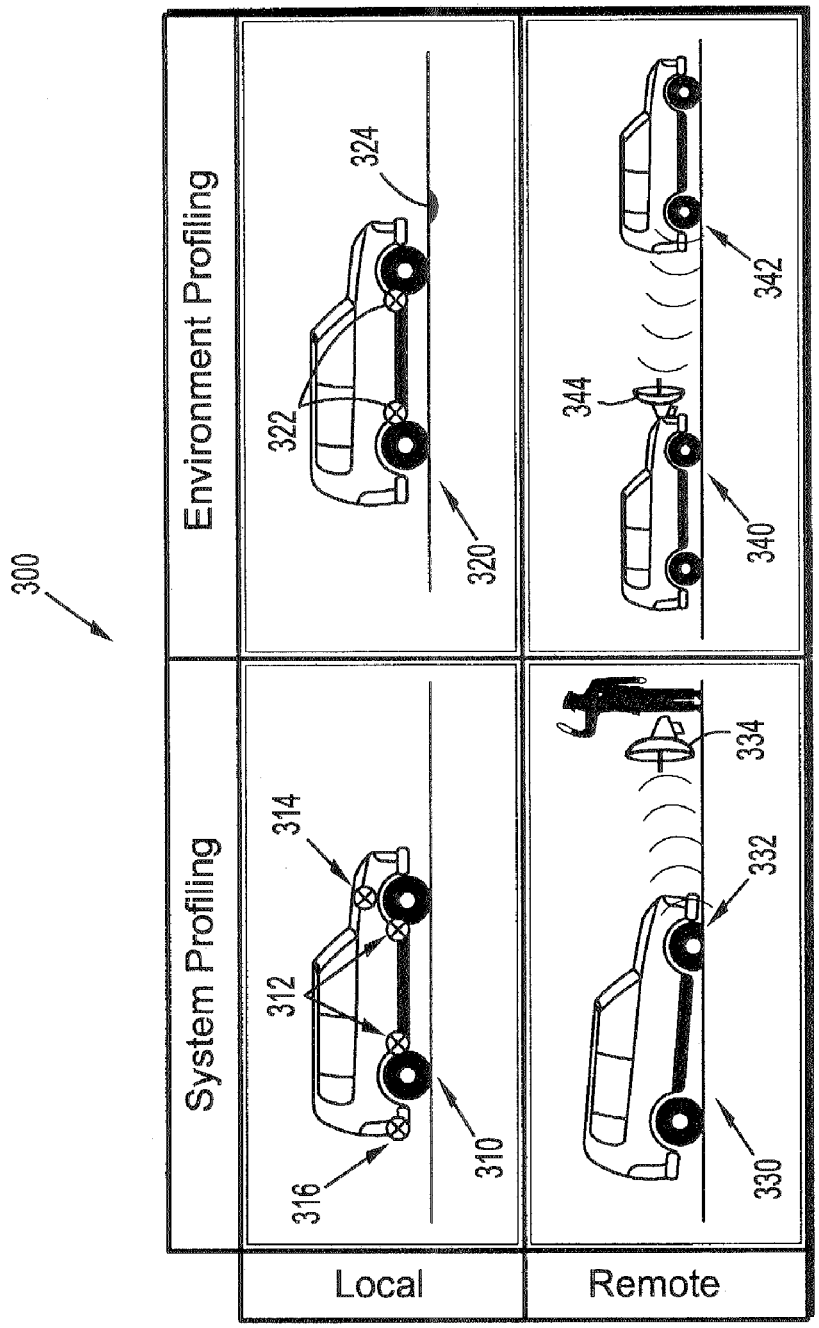
FIG. 3 shows a schematic diagram of exemplary configurations for sound based profiling in accordance with illustrative embodiments of the present disclosure.

Turning now to FIG. 3, configurations of sound based profiling are indicated generally by the reference numeral 300. Each configuration demonstrates a car-based application using sound detection and profiling. Acquisition of the sounds may involve the use of microphones, infrasonic, ultrasonic and/or long distance sound sensors.

In an exemplary local system profiling configuration, a car 310 is equipped with four corner or tire sound sensors 312, at least one engine sound sensor 314 and at least one exhaust sound sensor 316. Here, the sound sensors are designed to provide information to the driver regarding detected problems relating to at least the car engine, exhaust or tires. For instance, the driver of the car may be notified when an object such as a nail is caught in the tire, the tire has a cut, or that the brakes at that corner are worn. Sound sensors near the engine and exhaust would provide information regarding abnormal operation or condition of the vehicle engine. For example, sensors near the engine and exhaust would enable the system to detect if a particular piston in an engine is not firing properly, or if there is insufficient oil in the engine to lubricate the moving components. This sensing system provides the mechanism to forward timely information to the user regarding the status of their vehicle. This will save the user money and will avoid potentially hazardous situations for the driver and accompanying passengers.

In an exemplary local environment profiling configuration, a car 320 has sound sensors 322 attached onboard the car for the purpose of profiling the quality of the roads, such as a detecting a hole 324. This information may be relayed back to a base station to govern how the roads are maintained. This application can also be extended to trains for example. The sound sensors may be incorporated to measure the quality of the individual rails and preemptively identify rails that will need replacement.

In an exemplary remote system profiling configuration, a car 330 might have a defective tire 332, which can be detected with a remote sound sensor 334. For cars that do not have the onboard sound based sensors installed, public safety personnel can use remote sound based sensors to detect vehicles or conditions that represent a safety risk. These sound measurements may be taken while a vehicle is in motion. Cars with inefficient engines, which can cause safety hazards by failing to accelerate or maintain adequate speed, or those with cuts or bulges in their tires or an unbalanced wheel, may be detected using this approach. In addition, detecting and correcting inefficient car engines may reduce the environmental impacts and associated detrimental health effects on humans that have been attributed to the excessive emissions of poorly maintained vehicles.

In an exemplary remote environment profiling configuration, a detection system on a following car 340 may detect the sounds of a leading car 342 experiencing emergency braking by means of a sound sensor 344 mounted near the front of the following car 340. This scenario enables cars and other vehicles to detect sounds that may indicate a hazardous condition external to the car itself. This dangerous condition may relate to the sound of a car threshold braking, or one skidding its tires, or the sound of an ambulance siren on an emergency run. The appropriate sound may be detected so that the better informed driver can take the corresponding precautions.

Figure 4:
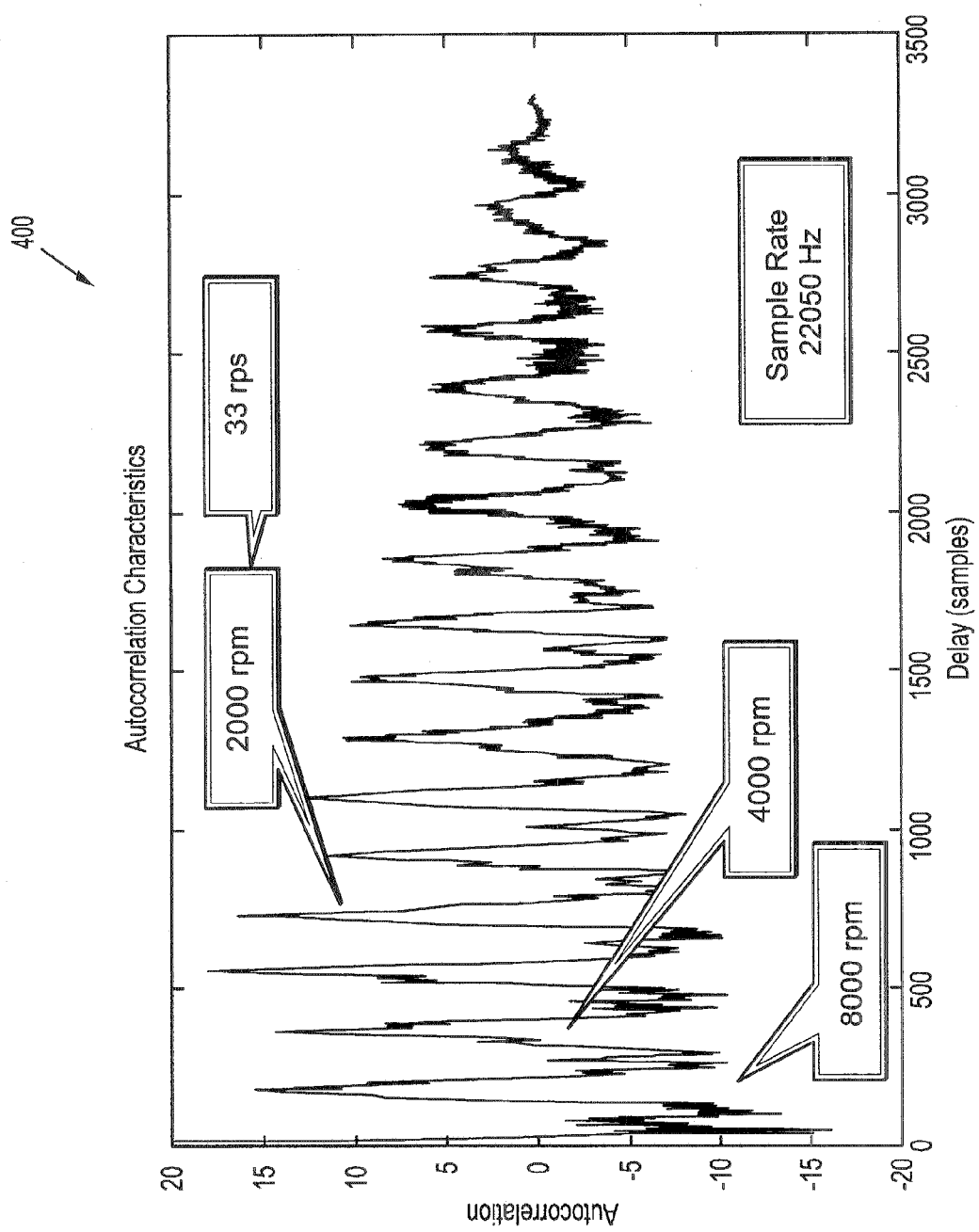
FIG. 4 shows a graphical diagram of an audio-based auto-correlation analysis for an automobile drive-by in accordance with an illustrative embodiment of the present disclosure.

As shown in FIG. 4, an audio-based autocorrelation analysis of an exemplary car drive-by is indicated generally by the reference numeral 400. Here, the number of pistons firing or combustions per second can be identified for internal combustion engines. As an example of the strength of audio profiling of cars, the analysis 400 shows the autocorrelation function of an audio sample of a car drive by, where the spacing between each peak relates to the delay between each spark plug firing. Assuming that each spark plug fires once per engine revolution, as in a 2-cycle engine, the number of revolutions can be acoustically determined. That is, for a 2-cycle, 4-cylinder system, the fourth peak relates to 2000 rpm. A determination of 2-cycle versus 4-cycle engines can also be made using the characteristic sounds produced by each, and the system will work equally well for reciprocating pistons or rotary pistons.

Such information can be used to detect if one piston in an engine is not firing properly, and this can be achieved while the vehicle is in motion as opposed to being measured only in a mechanic's workshop. This provides the opportunity for on-the-fly vehicle diagnostics and safety. Other periodic information relating to tire or wheel alignment noises can also be determined using a similar analysis. This information can also be used as part of a more comprehensive traffic statistics measurement solution.

An exemplary method is provided herein for machine diagnostics, detection and profiling using pressure waves. The exemplary method includes profiling known sources and/or safety threats, acquiring pressure wave data, analyzing the acquired pressure wave data, and detecting a source or safety threat if the analyzed pressure wave data matches a profiled known source or safety threat.

A corresponding exemplary system is provided herein for machine diagnostics, detection and profiling using pressure waves. The exemplary system includes a processor, a pressure wave transducer in signal communication with the processor, a pressure wave analysis unit in signal communication with the processor, and a threat detection unit in signal communication with the processor.

In addition, an exemplary program storage device is provided herein for machine diagnostics, detection and profiling using pressure waves. The exemplary program storage device includes program steps for profiling known sources and/or safety threats, acquiring pressure wave data, analyzing the acquired pressure wave data, and detecting a source or safety threat if the analyzed pressure wave data matches a profiled known source or safety threat.

Thus, exemplary embodiments provide a method of profiling, detecting and diagnosing machine components based on the sound that the part makes during operation. The sound sensors used for gathering the information may be audible, ultrasonic or infrasonic types, arranged singly, in arrays, or in sound dish form. In environment profiling configurations, the environment in which a machine operates may be analyzed. Sounds from the environment, other than the normal sounds of the machine itself, may be used to improve the efficiency or safety of operation of the machine or to alert its user.

The sound sensors may be placed on the machine itself for onboard detection and profiling, or remotely for recognizing events at a distance from the sound source. As will be recognized by those of ordinary skill in the pertinent art, any audio signal processing techniques or statistical or discriminative methods may be adapted to obtain information relating to the sound. Sound information may be used in the form of a profile, and be relayed with or without a communications channel back to a logging system, a centralized or distributed server and/or database. The technology may be used for traffic enforcement and control scenarios.

In alternate embodiments, the sounds from many types of machines may be analyzed. This includes but is not limited to all vehicles that operate on land, air, sea and in space, such as bicycles, motorbikes, motor vehicles, trucks, steamrollers, trailers, vans, sport utility vehicles, boats, ships, trains, planes, jets, tanks, rockets, shuttles, and horse-drawn buggies. Applications may also include machines used in the process of manufacturing, such as assembly line machines, home appliances and workshop tools. Machine exhaust systems, engine operation, tire/wheel/landing gear performance and integrity may be monitored. Structural stability of machines may also be monitored through the use of sound.

The environment in which a machine operates may be monitored by recording and analyzing, where the environment includes, but is not limited to, the sound from other traffic or machines, and the roadways and airways. The profile of the sounds may utilize, but is not limited to, the repeating or cyclic nature of sounds. Cyclical sound applications may refer to a rotating tire with a defect or cut located in the tread. The sound of the anomaly in the tire against the road as the vehicle travels will be of a repetitive nature. Detection of such a repeating sound may be achieved by, but is not limited to, an autocorrelation analysis of the sound signal.

The sound information from an engine may be used to determine profile information including, but not limited to, the number of pistons firing per second in an engine, the number of pistons in an engine, a defective valve or spark plug attributed to the absence or attributes of a signal, and the like. Defects in roadways may be detected through the use of the sound made from a tire impact against the pothole or defect in the road. Defects in vehicles and machine suspensions may also be detected through the use of the sound made when a tire impacts against a pothole, defect or otherwise special material in the road.

Preferred embodiments may also be applied to detecting defects in train tracks or wheels, and to detecting defects on airplane runways and airplane landing gear. Further, embodiments may relate to any or all possible machine and environmental sound examples corresponding to land, sea, air and space travel. In addition, other embodiments may be applied to detecting faults and profiling audio from manufacturing machines, workshop tools and home appliances.

It is to be understood that the teachings of the present disclosure may be implemented in various forms of hardware, software, firmware, special purpose processors, or combinations thereof. Most preferably, the teachings of the present disclosure are implemented as a combination of hardware and software.

Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units (CPU), a random access memory (RAM), and input/output (I/O) interfaces.

The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed.

Given the teachings herein, one of ordinary skill in the pertinent art will be able to contemplate these and similar implementations or configurations of the present disclosure.

Thus, the present disclosure sets forth an improved method for detecting a broader range of disparate sources and/or safety threats than was previously available. Some of the newly detectable sources or safety threats, particularly when applied in the context of transportation machines, were heretofore difficult or impossible for even skilled operators to sense or recognize.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure.

For example, the exemplary method for analyzing pressure waves may utilize template-matching, modal analysis, frequency domain and/or time domain analysis alone or in combination with existing vehicular or machine inputs. In addition, any type of pressure wave transducer may be substituted for the exemplary pressure wave transducers disclosed herein. Although the exemplary embodiments are generally directed towards pressure waves detected in air, it shall be recognized that pressure waves may propagate through other media, such as water and solids, in combination with or in addition to air. All such changes and modifications are intended to be included within the scope of the present disclosure as set forth in the appended claims.

What is claimed is:

1. A method for source profiling using pressure waves, the method comprising:
   profiling known pressure wave sources using time domain characteristics, wherein profiles of the known pressure wave sources correspond to respective cyclical pressure waves;
   acquiring pressure wave data;
   analyzing acquired pressure wave data by performing an audio-based autocorrelation analysis on the acquired pressure wave data to match the acquired pressure wave data to a matching profile of a known pressure wave source corresponding to a respective cyclical pressure wave from among the profiles of the known pressure wave sources; and
   detecting a source to be the known pressure wave source of the matching profile upon determining the match.

2. A method as defined in claim 1 wherein the detected source is indicative of a safety threat.

3. A method as defined in claim 1 wherein the detected source is indicative of at least one of a machine or its environment, the method further comprising monitoring operating conditions or measuring properties of the machine or its environment.

4. A method as defined in claim 1 wherein the known pressure wave source profiles are modeled or measured for potential or actual sources, respectively.

5. A method as defined in claim 1 wherein the pressure wave data is acquired from at least one of an onboard pressure wave sensor or a remote pressure wave sensor.

6. A method as defined in claim 1 wherein the pressure wave data is acquired from a microphone.

7. A method as defined in claim 1 wherein the pressure wave data is acquired from at least one of an infrasonic or ultrasonic sensor.

8. A method as defined in claim 1 wherein detecting a source comprises template-matching a time domain representation of a known pressure wave source with a time domain representation of the acquired pressure wave data.

9. A method as defined in claim 1 wherein detecting a source comprises detecting multiple sources.

10. A method as defined in claim 1, further comprising indicating a detected source to an operator.

11. A method as defined in claim 1, further comprising transmitting a signal indicative of a detected source to a remote location.

12. A method as defined in claim 1 wherein the acquired pressure wave data is indicative of a sound that a machine component makes during operation.

13. A method as defined in claim 1, further comprising at least one of:
profiling the acquired data and relaying it back to at least one of a logging system, a centralized or distributed server, or a database; or
using a detected source or machine/environment audio profile for traffic enforcement or control or the generation of statistics.

14. The method of claim 1 wherein the pressure wave data is remotely acquired from at least one of a pressure wave sensor and a microphone disposed on a first vehicle and the pressure wave data is produced by a second vehicle.

15. A system for source profiling using pressure waves, the system comprising:
a processor;
a pressure wave transducer in signal communication with the processor for acquiring pressure wave data;
a pressure wave analysis unit in signal communication with the processor for analyzing acquired pressure wave data by performing an audio-based autocorrelation analysis on the acquired pressure wave data to match the acquired pressure wave data to a matching profile of a known pressure wave source corresponding to a respective cyclical pressure wave; and
a source or threat detection unit in signal communication with the processor.

16. A system as defined in claim 15 wherein the pressure wave transducer comprises at least one microphone, infrasonic or ultrasonic sensor mounted on-board or remotely.

17. A computer-readable medium embodying instructions executed by a processor to perform program steps for machine diagnostics, detection and profiling using pressure waves, the program steps comprising:
profiling known pressure wave sources using time domain characteristics, wherein profiles of the known pressure wave sources correspond to respective cyclical pressure waves;
acquiring pressure wave data;
analyzing acquired pressure wave data by performing an audio-based autocorrelation analysis on the acquired pressure wave data to match the acquired pressure wave data to a matching profile of a known pressure wave source corresponding to a respective cyclical pressure wave from among the profiles of the known pressure wave sources; and
detecting a source to be the known pressure wave source of the matching profile upon determining the match.

18. The computer-readable medium of claim 17 wherein the pressure wave data is acquired from at least one of an onboard pressure wave sensor and a remote pressure wave sensor.

19. The computer-readable medium of claim 17 wherein the pressure wave data is remotely acquired from at least one of a pressure wave sensor and a microphone disposed on a first vehicle and the pressure wave data is produced by a second vehicle.

20. The computer-readable medium of claim 17, further comprising indicating a detected source to one of an operator and a remote location.

* * * * *